United States Patent
Staley

(10) Patent No.: US 9,051,911 B2
(45) Date of Patent: Jun. 9, 2015

(54) ENGINE CRANKSHAFT ISOLATOR ASSEMBLY

(75) Inventor: Eric D. Staley, Flushing, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 426 days.

(21) Appl. No.: 13/459,334

(22) Filed: Apr. 30, 2012

(65) Prior Publication Data

US 2013/0284139 A1 Oct. 31, 2013

(51) Int. Cl.
| | |
|---|---|
| *F16H 55/36* | (2006.01) |
| *F02N 15/08* | (2006.01) |
| *F16D 3/12* | (2006.01) |
| *F16F 15/123* | (2006.01) |
| *F16F 15/14* | (2006.01) |
| *F02B 67/06* | (2006.01) |
| *F16D 3/10* | (2006.01) |

(52) U.S. Cl.
CPC ............... *F02N 15/08* (2013.01); *F02B 67/06* (2013.01); *F16D 3/10* (2013.01); *F16D 3/12* (2013.01); *F16F 15/123* (2013.01); *F16F 15/1442* (2013.01)

(58) Field of Classification Search
CPC .................................................. F02B 67/06
USPC ........ 123/192.1, 192.2, 198 R; 474/166, 171, 474/177, 178; 192/90, 84.81, 81 C
See application file for complete search history.

(56) References Cited

U.S. PATENT DOCUMENTS

| | | | | |
|---|---|---|---|---|
| 4,273,226 | A * | 6/1981 | Takefuta et al. ................. | 192/35 |
| 7,591,357 | B2 * | 9/2009 | Antchak et al. ............... | 192/55.5 |
| 8,182,382 | B2 * | 5/2012 | Riu ................. | 474/166 |
| 8,272,982 | B2 * | 9/2012 | Fitz ................................ | 474/94 |
| 2002/0045508 | A1 * | 4/2002 | Man et al. ......................... | 475/5 |
| 2006/0154763 | A1 * | 7/2006 | Serkh .............................. | 474/59 |
| 2008/0153638 | A1 * | 6/2008 | Serkh .............................. | 474/74 |
| 2008/0214348 | A1 * | 9/2008 | Hasegawa et al. .............. | 475/80 |
| 2010/0009796 | A1 | 1/2010 | Fitz | |
| 2010/0116617 | A1 * | 5/2010 | Serkh et al. ................... | 192/41 S |
| 2010/0120563 | A1 * | 5/2010 | Serkh et al. ..................... | 474/74 |
| 2010/0234156 | A1 * | 9/2010 | Riu ................. | 474/171 |
| 2010/0255943 | A1 * | 10/2010 | Cali et al. ........................ | 474/94 |

* cited by examiner

*Primary Examiner* — Stephen K Cronin
*Assistant Examiner* — Joseph Dallo
(74) *Attorney, Agent, or Firm* — Harness, Dickey & Pierce, P.L.C.

(57) ABSTRACT

An engine assembly includes an engine structure, a crankshaft rotationally supported on the engine structure, a crankshaft isolator assembly and a belt. The crankshaft isolator assembly includes a hub fixed for rotation with the crankshaft, a crankshaft isolator pulley coupled to the hub, and a mechanical clutch. The mechanical clutch is engaged with the hub and the crankshaft isolator pulley. The mechanical clutch fixes the hub for rotation with the crankshaft isolator pulley during a first operating condition and allows relative rotation between the hub and the crankshaft isolator pulley during a second operating condition. The belt is engaged with the crankshaft isolator pulley and an accessory drive system.

14 Claims, 3 Drawing Sheets

ENGINE CRANKSHAFT ISOLATOR ASSEMBLY

FIELD

The present disclosure relates to engine crankshaft isolator assemblies.

BACKGROUND

This section provides background information related to the present disclosure which is not necessarily prior art.

Internal combustion engines may include a starter that initially powers rotation of the crankshaft during engine-start conditions. The initial starting event may produce a torque reversal that is noticeable by a driver. In hybrid start-stop systems, the engine may experience numerous starting and stopping events, providing numerous engine-off and engine-on transitions that may impact vehicle drivability.

SUMMARY

According to the present disclosure, an engine assembly may include an engine structure, a crankshaft rotationally supported on the engine structure, a crankshaft isolator assembly and a belt. The crankshaft isolator assembly may include a hub fixed for rotation with the crankshaft, a crankshaft isolator pulley coupled to the hub, and a mechanical clutch. The mechanical clutch may be engaged with the hub and the crankshaft isolator pulley. The mechanical clutch may fix the hub for rotation with the crankshaft isolator pulley during a first operating condition and may allow relative rotation between the hub and the crankshaft isolator pulley during a second operating condition. The belt may be engaged with the crankshaft isolator pulley and an accessory drive system.

The engine assembly may additionally include a motor that forms a starter having a motor pulley. The belt may be engaged with the crankshaft isolator pulley and the motor pulley.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. As used herein, the term "module" refers to an application specific integrated circuit (ASIC), an electronic circuit, and/or a processor (shared, dedicated, or group) and memory that execute one or more software or firmware programs.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
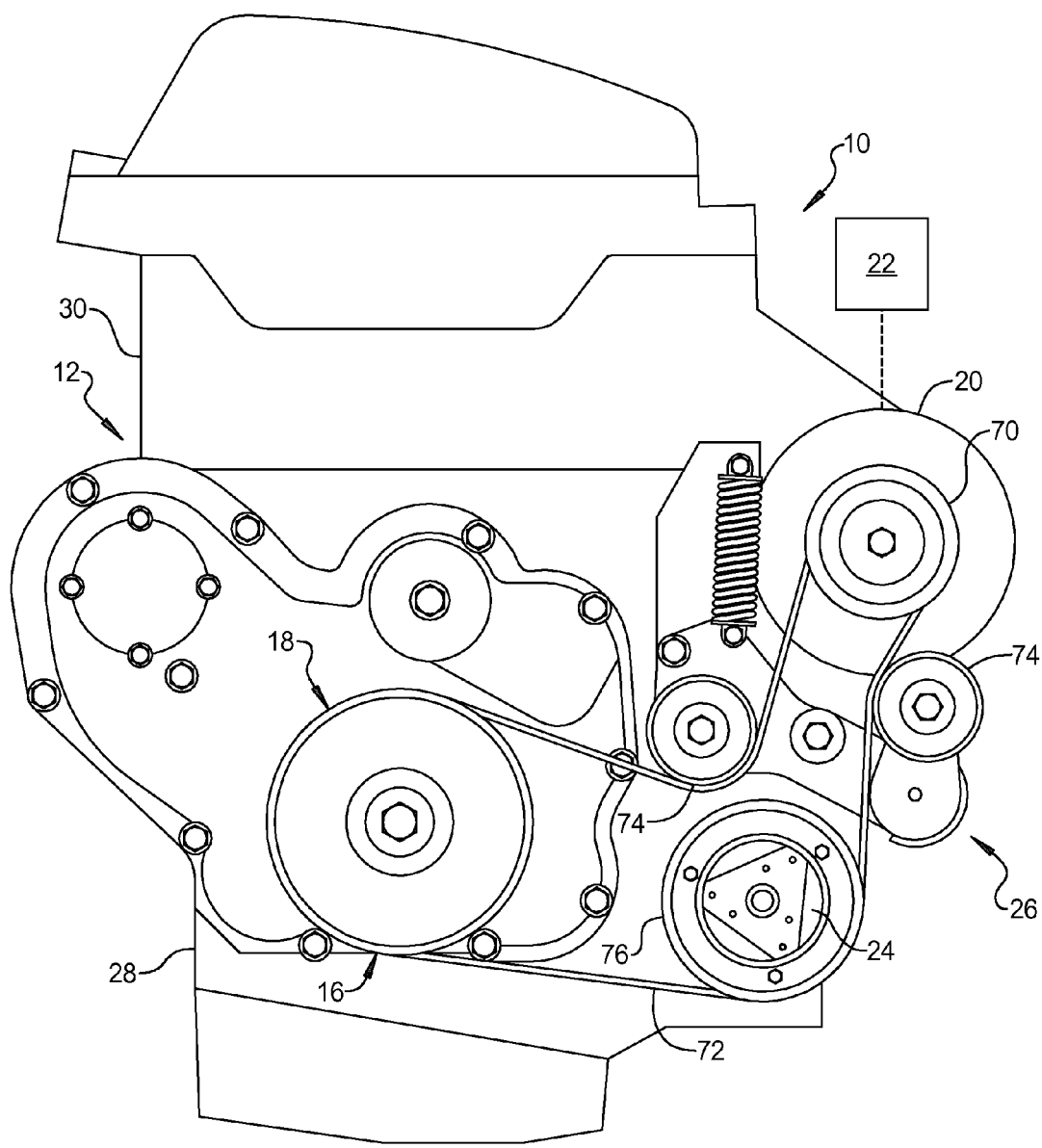
FIG. 1 is a plan view of an engine assembly according to the present disclosure.
Figure 2:
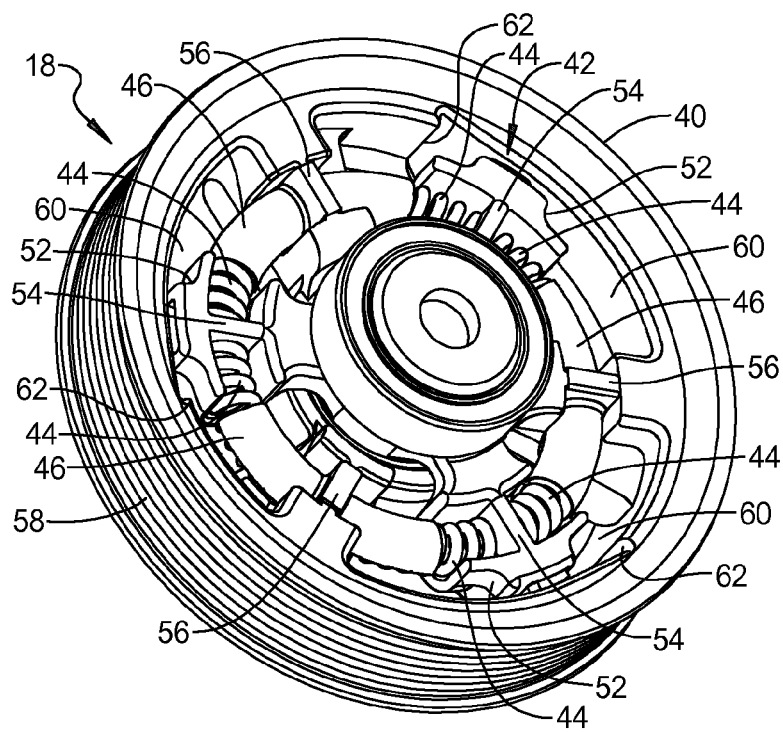
FIG. 2 is a perspective view of a crankshaft isolator pulley from the engine assembly of FIG. 1.
Figure 3:
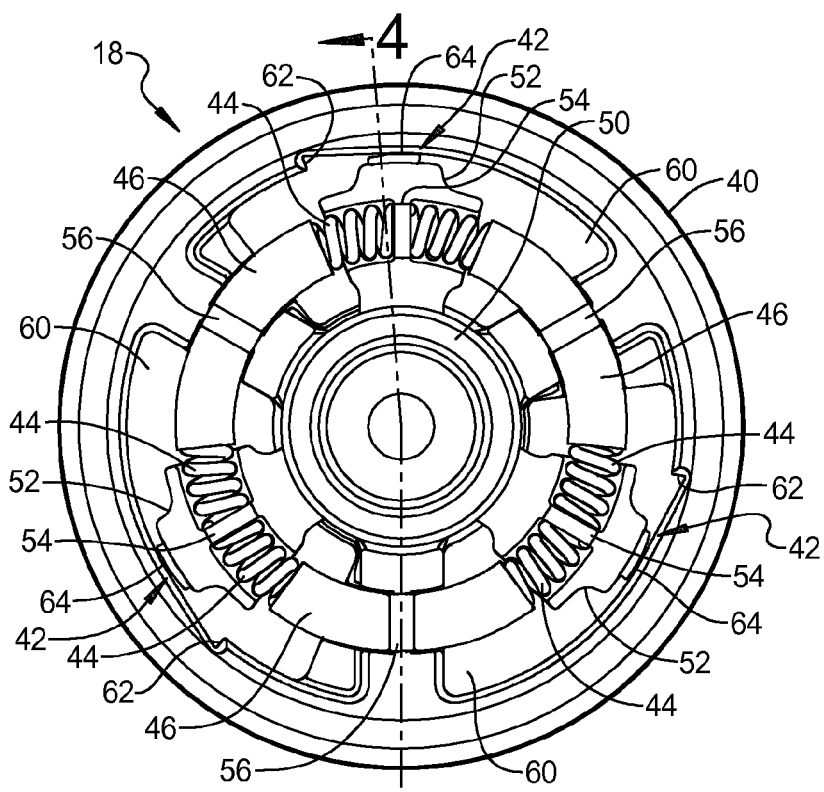
FIG. 3 is a plan view of the internal components of the crankshaft isolator pulley from FIG. 1.
Figure 4:
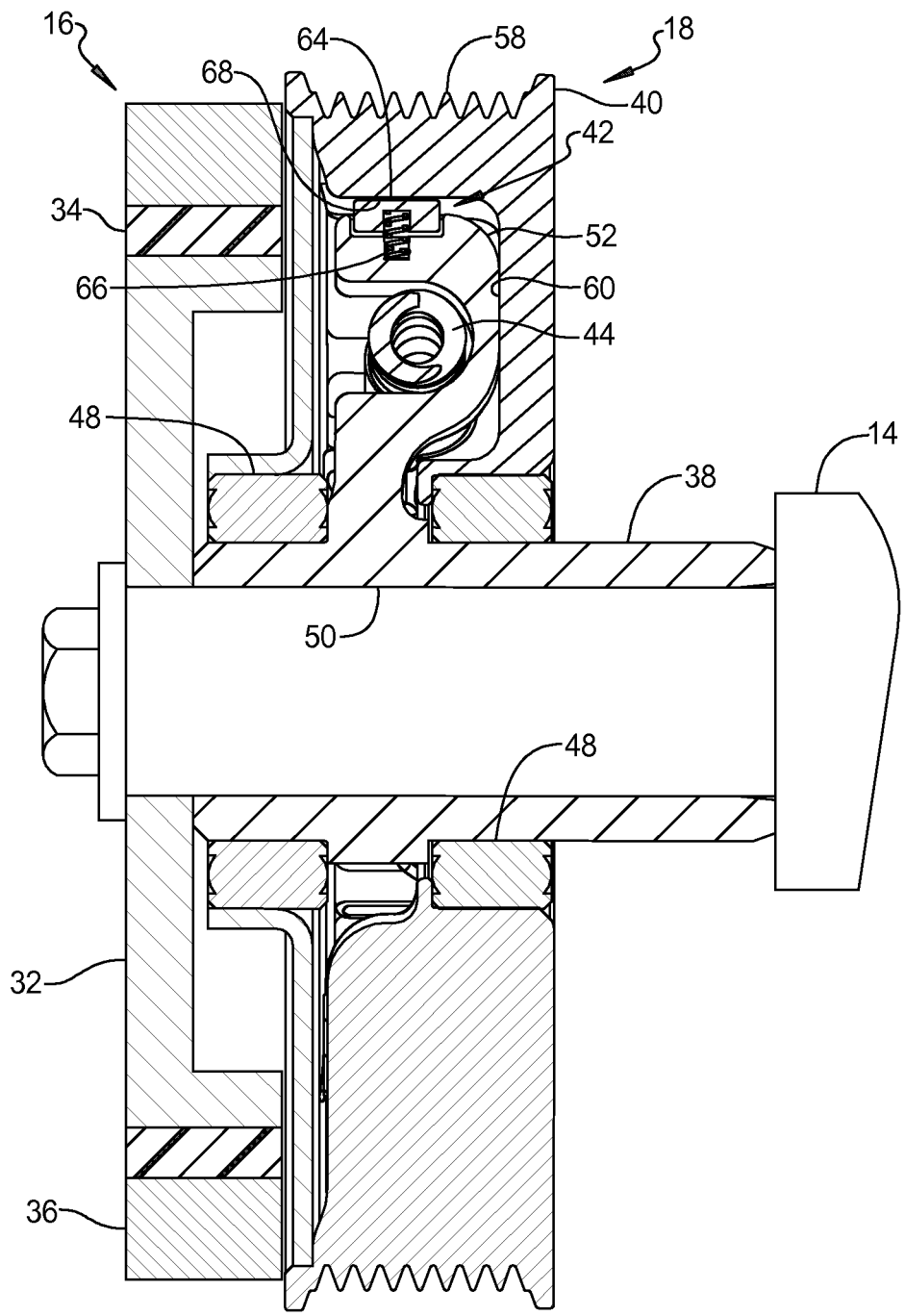
FIG. 4 is a section view of the crankshaft isolator pulley and a crankshaft damper located on a crankshaft from the engine assembly of FIG. 1.

With reference to FIGS. 1-4, an engine assembly 10 may include an engine structure 12, a crankshaft 14, a crankshaft damper 16, a crankshaft isolator assembly 18, an electric motor 20, a battery 22, an air conditioner compressor 24 and an accessory drive system 26. The engine structure 12 may include an engine block 28 and a cylinder head 30 coupled to the engine block 28. The crankshaft 14 may be supported for rotation on the engine block 28. As seen in FIG. 4, the crankshaft damper 16 and the crankshaft isolator assembly 18 may each be coupled to an end of the crankshaft 14.

The crankshaft damper 16 may damp torsional vibrations imparted on the crankshaft 14 from combustion and may include a hub 32, a compliant material 34 and a mass 36. The hub 32 may be fixed for rotation with the crankshaft 14 and the compliant material 34 may be located between and fixed to the hub 32 and the mass 36. The compliant material 34 may take a variety of forms including, but not limited to, and elastomer.

The crankshaft isolator assembly 18 may include a hub 38, a crankshaft isolator pulley 40, a mechanical clutch 42, torsional springs 44, spring guides 46 and bearings 48. The hub 38 may be fixed for rotation with the crankshaft 14 and may be coupled to the crankshaft isolator pulley 40 via the torsional spring 44 during normal engine operation and may be coupled to the crankshaft isolator pulley 40 via the mechanical clutch 42 during engine start-up. The hub 38 may include a central body 50 receiving the crankshaft 14 and radial arms 52 extending outward from the central body 50. The arms 52 may define spring seats 54 engaged with first ends of the torsional springs 44.

The spring guides 46 may be fixed for rotation with the crankshaft isolator pulley 40 and may define additional spring seats 56 engaged with second ends of the torsional springs 44. The torsional springs 44 may generally bias the crankshaft isolator pulley 40 into a neutral position (seen in FIG. 3) and may apply a rotational force to the crankshaft isolator pulley 40 and the hub 38 as the crankshaft isolator pulley 40 is rotated relative to the hub. The torsional springs 44 may transmit rotation of the hub 38 to the crankshaft isolator pulley 40 while allowing limited relative rotation between the hub 38 and the crankshaft isolator pulley 40. The crankshaft isolator pulley 40 may define an outer circumferential pulley surface 58 and an inner cavity 60. The arms 52 of the hub 38 may be located in the cavity 60.

The mechanical clutch 42 may include clutch stops 62, clutch actuators 64 and biasing members 66. The clutch stop 62 may be defined by an inner circumferential surface 68 of the cavity 60. The clutch actuator 64 may be located between an outer circumference of the arms 52 of the hub 38 and the inner circumferential surface 68 of the cavity 60. In the present non-limiting example, the clutch actuators 64 are fixed for rotation with the hub 38. However, it is understood that the present disclosure is not limited to such arrangements. For example, alternate arrangements may include the clutch actuators 64 being fixed for rotation with the crankshaft isolator pulley 40 and the clutch stops 62 being defined on the hub 38. The biasing members 66 may force the clutch actuators 64 in an outward radial direction into sliding engagement with the inner circumferential surface 68 of the cavity 60.

The electric motor 20 may include a motor pulley 70 and may be in communication with the battery 22. The electric motor 20 may form a starter for the engine assembly 10 and a generator for the battery 22. The accessory drive system may include a belt 72, belt tensioners 74, an air conditioner compressor pulley 76, the motor pulley 70 and the crankshaft isolator pulley 40. The belt 72 may be engaged with the belt tensioners 74, the air conditioner compressor pulley 76, the motor pulley 70 and the crankshaft isolator pulley 40.

During a first operating condition, the electric motor 20 acts as a starter and powers rotation of the crankshaft 14 via the belt 72. During a second operating condition, the crankshaft 14 may power rotation of the motor pulley 70 and the electric motor 20 may form a generator to charge the battery 22. The second operating condition may include normal engine operation with in-cylinder combustion powering rotation of the crankshaft 14 in a first rotational direction (R1).

During the first operating condition, the electric motor 20 may drive the crankshaft isolator pulley 40 in the first rotation direction from the neutral position shown in FIG. 3 until the clutch actuators 64 abut the clutch stops 62 and fix the hub 38 for rotation with the crankshaft isolator pulley 40 in the first rotational direction (R1). The neutral position may provide for a first angular displacement ($\theta 1$) of the crankshaft isolator pulley 40 in the first rotation direction (R1) before the hub 38 is fixed for rotation with the crankshaft isolator pulley 40 in the first rotational direction (R1). As a result, the transition between engine-off and engine-on conditions may be less noticeable to a driver. The first angular displacement ($\theta 1$) may be greater than five degrees and more specifically greater than ten degrees.

During the second operating condition, the torsional springs 44 may be compressed as the crankshaft isolator pulley 40 oscillates relative to the hub 38 and the crankshaft 14 due to loads applied by the accessory drive system 26. The torsional springs 44 may generally damp the load applied to the crankshaft 14 by the accessory drive system 26. The torsional springs 44 may be sized to allow a second angular displacement ($\theta 2$) in the first rotational direction and in a second rotational direction (R2) opposite the first rotational direction (R1). The second angular displacement ($\theta 2$) may be less than the first angular displacement ($\theta 1$). The second angular displacement ($\theta 2$) may be less than ten degrees. In the present non-limiting example, the second angular displacement ($\theta 2$) is approximately fifteen degrees and the first angular displacement ($\theta 1$) is approximately twenty degrees.

In the present non-limiting example, the engine assembly 10 forms a start-stop hybrid application where the engine assembly 10 is temporarily shut down during temporary stops and re-started when travel resumes. The crankshaft isolator assembly 18 discussed above including the mechanical clutch 42 accommodates the torque reversals experienced during re-starting the engine assembly 10.

What is claimed is:

1. A crankshaft isolator assembly comprising:
   a hub adapted to be fixed for rotation with an engine crankshaft;
   a crankshaft isolator pulley coupled to the hub and adapted to engage a belt engaged with an accessory drive system; and
   a mechanical clutch engaged with the hub and the crankshaft isolator pulley and fixing the hub for rotation with the crankshaft isolator pulley during a first operating condition and allowing relative rotation between the hub and the crankshaft isolator pulley during a second operating condition, wherein the crankshaft isolator pulley is rotatable relative to the hub in a first rotational direction until the mechanical clutch fixes the hub for rotation with the crankshaft isolator pulley in first rotational direction, wherein the mechanical clutch allows for at least 5 degrees of rotation of the crankshaft isolator pulley in the first rotational direction relative to the hub before the mechanical clutch fixes the hub for rotation with the crankshaft isolator pulley in first rotational direction.

2. The crankshaft isolator assembly of claim 1, further comprising a torsional spring engaged with the hub and the crankshaft isolator pulley, the torsional spring transmitting rotation of the hub to the crankshaft isolator pulley while allowing limited relative rotation between the hub and the crankshaft isolator pulley.

3. The crankshaft isolator assembly of claim 2, wherein the crankshaft isolator pulley is rotatable relative to the hub by at least 10 degrees in first and second rotational directions opposite one another during the second operating condition.

4. The crankshaft isolator assembly of claim 1, wherein the mechanical clutch includes a clutch actuator fixed for rotation with one of the hub and the crankshaft isolator pulley and a clutch stop defined on the other of the hub and the crankshaft isolator pulley, the hub being fixed for rotation with the crankshaft isolator pulley during the first operating condition when the clutch actuator abuts the clutch stop.

5. The crankshaft isolator assembly of claim 4, further comprising a torsional spring engaged with the hub and the crankshaft isolator pulley, the torsional spring transmitting rotation of the hub to the crankshaft isolator pulley while allowing limited relative rotation between the hub and the crankshaft isolator pulley, the crankshaft isolator pulley defining a cavity forming an inner circumferential surface defining the clutch stop, the clutch actuator being fixed for rotation with the hub and having a biasing member forcing the clutch actuator in an outward radial direction and into engagement with the inner circumferential surface of the crankshaft isolator pulley.

6. An engine assembly comprising:
an engine structure;
a crankshaft rotationally supported on the engine structure;
a crankshaft isolator assembly including:
    a hub fixed for rotation with the crankshaft;
    a crankshaft isolator pulley coupled to the hub; and
    a mechanical clutch engaged with the hub and the crankshaft isolator pulley and fixing the hub for rotation with the crankshaft isolator pulley during a first operating condition and allowing relative rotation between the hub and the crankshaft isolator pulley during a second operating condition;
a belt engaged with the crankshaft isolator pulley and an accessory drive system; and
a motor that forms a starter including a motor pulley engaged with the belt, wherein the first operating condition includes engine start-up with the motor powering rotation of the crankshaft via the belt, wherein the crankshaft isolator pulley is rotated relative to the hub in a first rotational direction until the mechanical clutch fixes the hub for rotation with the crankshaft isolator pulley, wherein the mechanical clutch allows for at least 5 degrees of rotation of the crankshaft isolator pulley in the first rotational direction relative to the hub before the mechanical clutch fixes the hub for rotation with the crankshaft isolator pulley in the first rotational direction.

7. The engine assembly of claim 6, wherein the second operating condition includes the crankshaft powering rotation of the motor pulley via the belt.

8. The engine assembly of claim 7, wherein the crankshaft isolator assembly includes a torsional spring engaged with the hub and the crankshaft isolator pulley, the torsional spring transmitting rotation of the hub to the crankshaft isolator pulley while allowing limited relative rotation between the hub and the crankshaft isolator pulley.

9. The engine assembly of claim 8, wherein the crankshaft isolator pulley is rotatable relative to the hub by at least 10 degrees in first and second rotational directions opposite one another during the second operating condition.

10. The engine assembly of claim 6, wherein the mechanical clutch includes a clutch actuator fixed for rotation with one of the hub and the crankshaft isolator pulley and a clutch stop defined on the other of the hub and the crankshaft isolator pulley, the hub being fixed for rotation with the crankshaft isolator pulley during the first operating condition when the clutch actuator abuts the clutch stop.

11. The engine assembly of claim 10, wherein the mechanical clutch includes a torsional spring engaged with the hub and the crankshaft isolator pulley, the torsional spring transmitting rotation of the hub to the crankshaft isolator pulley while allowing limited relative rotation between the hub and the crankshaft isolator pulley, the crankshaft isolator pulley defining a cavity forming an inner circumferential surface defining the clutch stop, the clutch actuator being fixed for rotation with the hub and having a biasing member forcing the clutch actuator in an outward radial direction and into engagement with the inner circumferential surface of the crankshaft isolator pulley.

12. The engine assembly of claim 6, further comprising a crankshaft damper coupled to the crankshaft and adapted to damp torsional vibrations of the crankshaft during the second operating condition.

13. An engine assembly comprising:
an engine structure;
a crankshaft rotationally supported on the engine structure;
a crankshaft isolator assembly including:
    a hub fixed for rotation with the crankshaft and defining a plurality of first spring seats;
    a crankshaft isolator pulley coupled to the hub and defining a plurality of second spring seats;
    a plurality of torsion spring members each engaged with a corresponding one of the plurality of first spring seats of the hub and with a corresponding one of the plurality of second spring seats of the crankshaft isolator pulley and coupling the hub and the crankshaft isolator pulley for rotation with one another while allowing limited relative rotation between the hub and the crankshaft isolator pulley; and
    a mechanical clutch engaged with the hub and the crankshaft isolator pulley and fixing the hub for rotation with the crankshaft isolator pulley during a first operating condition and allowing the limited relative rotation between the hub and the crankshaft isolator pulley during a second operating condition;
a motor that forms a starter including a motor pulley; and
a belt engaged with the crankshaft isolator pulley and the motor pulley.

14. The engine assembly of claim 13, wherein the first operating condition includes engine start-up with the motor powering rotation of the crankshaft via the belt and the second operating condition includes the crankshaft powering rotation of the motor pulley via the belt.

* * * * *